United States Patent [19]
Gori et al.

[11] Patent Number: 5,706,931
[45] Date of Patent: Jan. 13, 1998

[54] DEVICE FOR TRANSFERRING PRODUCTS

[75] Inventors: Andrea Gori, Bologna; Fulvio Boldrini, Ferrara, both of Italy

[73] Assignee: G.D. S.P.A., Bologna, Italy

[21] Appl. No.: 603,555

[22] Filed: Feb. 21, 1996

[30] Foreign Application Priority Data

Feb. 24, 1995 [IT] Italy ................ BO95A 0064

[51] Int. Cl.⁶ ................................................ B65G 47/22
[52] U.S. Cl. ................................................ 198/493; 406/82
[58] Field of Search ........................ 198/370.11, 493; 406/51, 77, 79, 82

[56] References Cited

U.S. PATENT DOCUMENTS

| | | | |
|---|---|---|---|
| 2,345,310 | 3/1944 | Willoughby | 198/493 X |
| 3,502,195 | 3/1970 | Benner | 406/82 X |
| 4,311,229 | 1/1982 | Bennett | 198/493 X |
| 4,358,226 | 11/1982 | Nagata et al. | 406/82 |
| 4,740,113 | 4/1988 | Hirose et al. | 406/82 X |

FOREIGN PATENT DOCUMENTS

| | | | |
|---|---|---|---|
| 1102293 | 2/1968 | United Kingdom | 406/79 |
| 1 256 506 | 12/1971 | United Kingdom | B65G 3/10 |

*Primary Examiner*—James R. Bidwell
*Attorney, Agent, or Firm*—Cushman Darby & Cushman Intellectual Property Group of Pillsbury Madison & Sutro LLP

[57] ABSTRACT

Products are transferred from a first conveyor to a second conveyor along a set feed path by a device including a pressurized pneumatic duct interposed substantially with no break in continuity between the outfeed end of the first conveyor and the infeed end of the second conveyor. The pneumatic duct is connected to a source of compressed air, which is admitted convergently with the feed direction and at a velocity and rate of flow such that the products are invested with movement by fluid power alone and caused thus to pass along the duct toward the infeed end of the second conveyor.

7 Claims, 2 Drawing Sheets

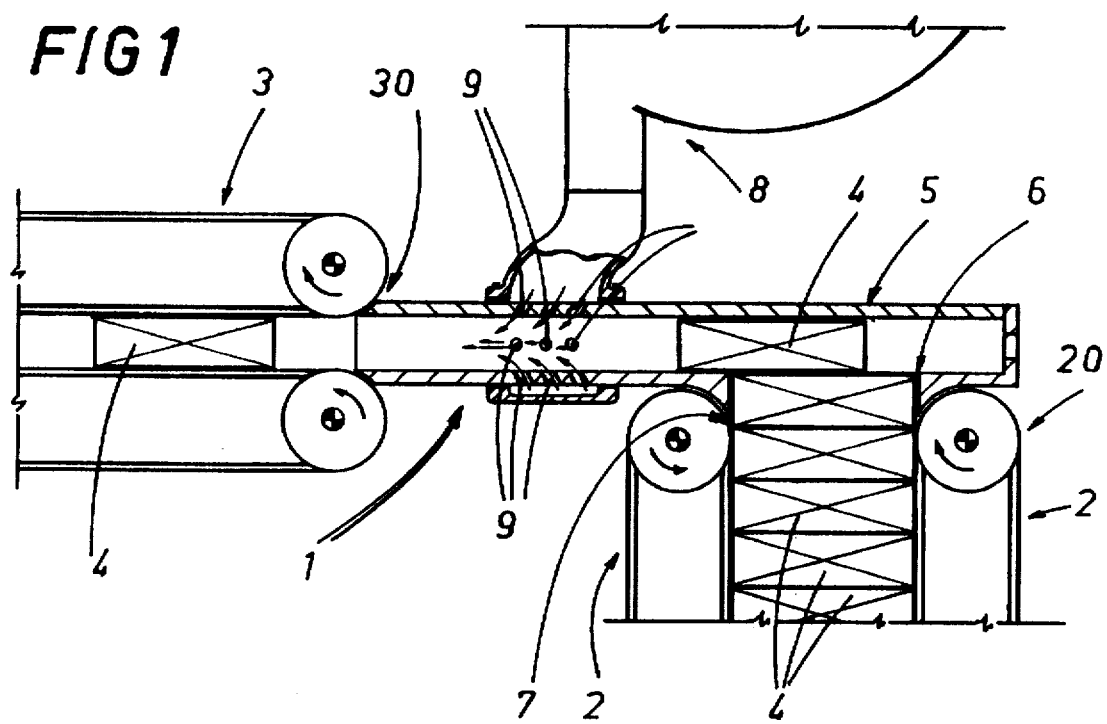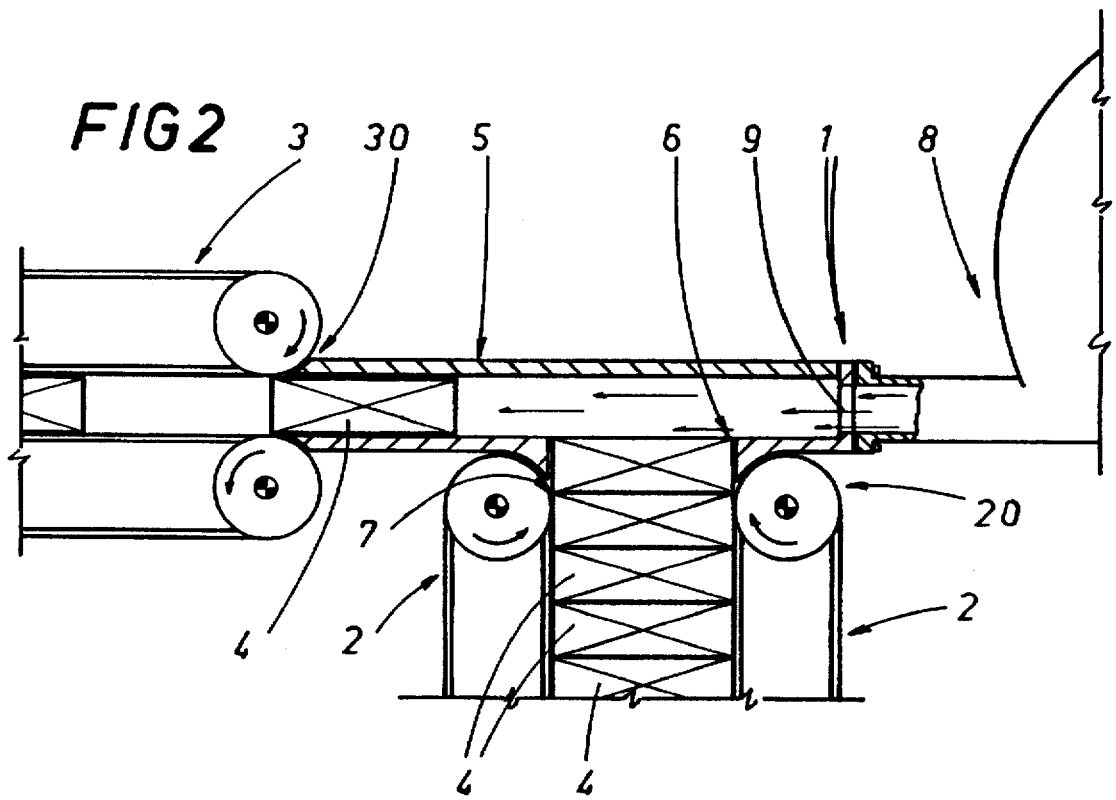

5,706,931

1

DEVICE FOR TRANSFERRING PRODUCTS

BACKGROUND OF THE INVENTION

The present invention is concerned with a device for transferring products.

In particular, the invention relates to the art field embracing devices such as will transfer products from a first conveyor to a further conveyor of which the feed direction is disposed perpendicular to that of the first conveyor.

A transfer of this type is often required in wrapping machines, where products of essentially parallelepiped shape must pass from a vertically disposed conveyor, by which several products are supported and elevated intermittently in stacked formation, to a horizontal conveyor along which the products advance singly and in succession.

Conventional transfer devices of the type in question are mechanical in operation, and will appear generally as a push rod caused to reciprocate in alignment with the horizontal conveyor.

The push rod is capable of movement thus between a retracted position, occupied while the products are being directed upwards by the vertical conveyor, and an extended position assumed as the result of removing one or more of the products from the stack supported by the vertical conveyor and directing them onto the horizontal conveyor.

A transfer device of this type is simple, but betrays serious mechanical and operational limitations due to the fact that the stack of products cannot be elevated by the vertical conveyor until the push rod has been returned to the retracted position. This means that the length of stroke and the velocity of the push rod become critical, as factors determining the duration of the pause for which the vertical conveyor remains idle. To curtail the duration of the pause or raise the operating speed of the conveyors, the available options are either to shorten the stroke of the push rod or to increase its velocity. In some instances it may not be feasible to shorten the stroke, while the velocity cannot be increased beyond certain values by reason of the type of motion, i.e. reciprocating, with which the push rod is invested.

Given, as intimated above, that the operating speed of a machine equipped with a conventional transfer device cannot be increased beyond certain limits, the object of the present invention is on the contrary to provide a non-mechanical type of transfer device such as will enable a considerable increase in the operating speed of the wrapping machine overall.

SUMMARY OF THE INVENTION

The stated object is realized according to the present invention in a device such as will transfer products from the outfeed end of a first conveyor to the infeed end of a second conveyor along a predetermined feed path.

The essential feature of such a device is that it comprises a pressurized pneumatic duct interposed substantially with no break in continuity between the outfeed end of the first conveyor and the infeed end of the second conveyor, and connected to a source of pressurized gas from which gas is delivered into the duct in a direction substantially convergent with the feed direction along which the products are conveyed.

BRIEF DESCRIPTION OF THE DRAWINGS

The invention will now be described in detail, by way of example, with the aid of the accompanying drawings, in which:

2

Figure 3:
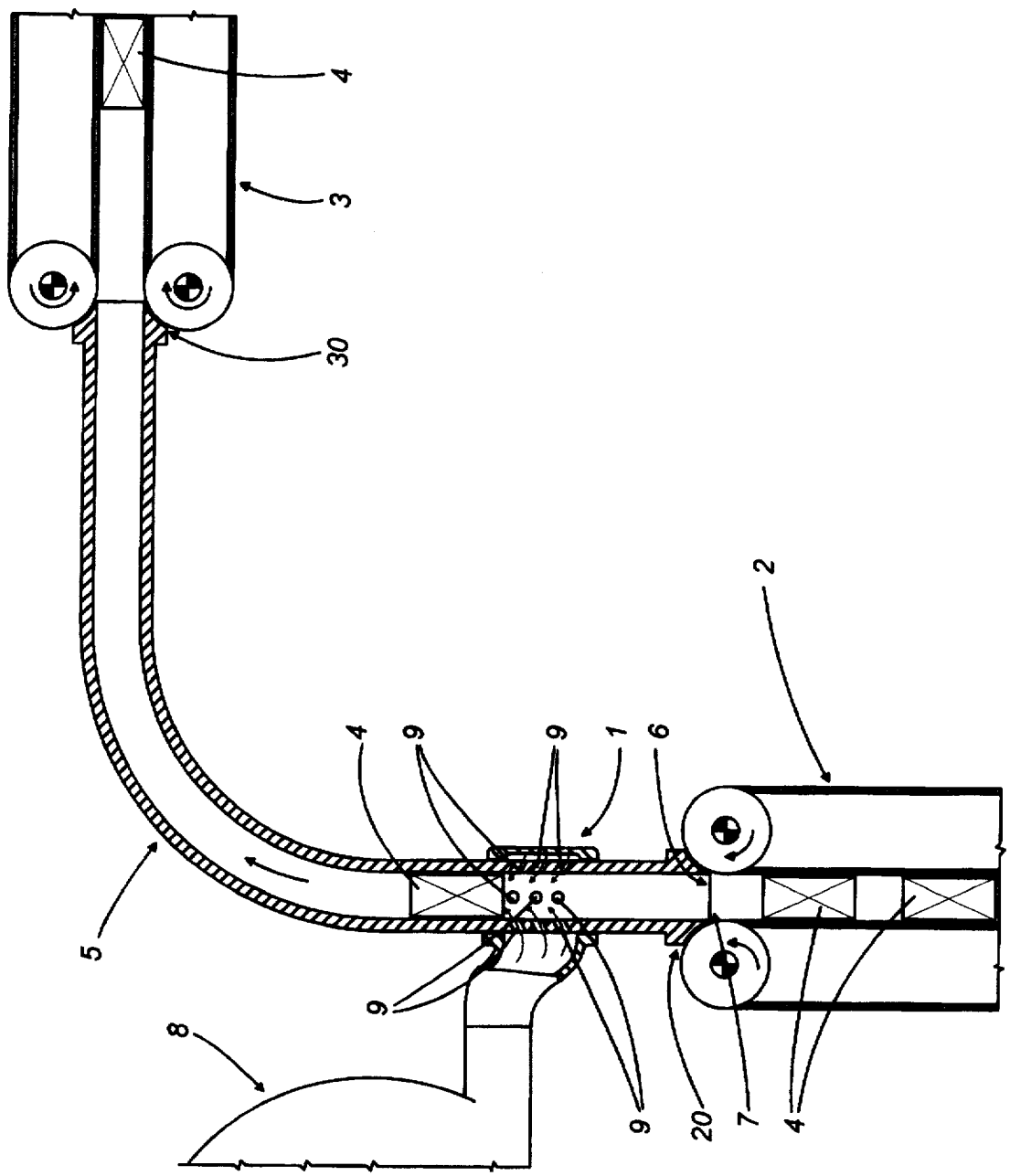

FIG. 1 illustrates a transfer device embodied in accordance with the present invention, viewed in a side elevation;

FIG. 2 illustrates a further embodiment of the device according to the present invention, viewed in a side elevation; and FIG. 3 illustrates a further embodiment of the device according to the present invention, viewed in a side elevation.

DESCRIPTION OF THE PREFERRED EMBODIMENTS

Referring to the accompanying drawings, the device to which the present invention relates, denoted 1 in its entirety, is located between two conveyors denoted 2 and 3 respectively. Each of the two conveyors 2 and 3 consists in a pair of power driven belts, conventional in embodiment.

A first conveyor 2 extends in a vertical direction and supports a plurality of products 4 stacked one on top of another, which are elevated intermittently by the movement of the belts.

A second conveyor 3 extends in a horizontal direction and serves to advance the products 4 in single file. The device 1 is interposed between the outfeed end 20 of the vertical conveyor 2 and the infeed end 30 of the horizontal conveyor 3, and takes the form of a pressurized pneumatic duct 5 disposed substantially in alignment with the horizontal conveyor 3.

The pneumatic duct 5 comprises a lateral opening 6 located to coincide substantially with the discharge extremity or outlet 7 afforded by the outfeed end 20 of the vertical conveyor 2, and presents an internal cross section substantially matching the section of the single products 4 to be transferred.

The duct 5 is connected to a source 8 of pressurized gas, for example compressed air, such as will displace a single product 4 once positioned fully inside the duct 5.

As discernible from FIGS. 1 and 2, there are at least two ways in which the source 8 of compressed air can be connected to the duct 5 in such a way as to invest the products 4 with movement.

In FIG. 1, the source 8 of compressed air is connected with the duct 5 by way of one or more inlet holes 9 located between the two conveyors 2 and 3. The holes 9 in question are angled in relation to the longitudinal axis of the duct 5 and directed toward the horizontal conveyor 3. More exactly, the diameter and inclination of the inlet holes 9 will be such as to generate what is substantially a Venturi effect within the duct 5, or at all events to generate negative pressure in the part of the duct 5 that extends between the lateral opening 6 and the holes 9 themselves. Accordingly, a product 4 emerging from the outlet 7 of the vertical conveyor 2 will be pulled by the resulting depression at least as far as the inlet holes 9, and thereupon pushed by the force of the compressed air toward the horizontal conveyor 3.

To increase the aspirating force generated with this type of solution, the inlet holes 9 might be located in different positions along the axial dimension of the duct 5, as illustrated in FIG. 1.

In the example of FIG. 2, compressed air is directed from the source 8 into the duct 5 by way of an inlet hole 9 located preceding the lateral opening 6 in the conveying direction. In this instance the products 4 are directed toward the horizontal conveyor 3 likewise pneumatically, though entirely by a pushing force.

In either solution, the product 4 becomes subject to the pneumatically generated pulling action (FIG. 1) or pushing action (FIG. 2) when lifted into the pneumatic duct 5. As soon as a product 4 is positioned fully within the dimensional compass of the duct 5, it will be drawn or driven toward the horizontal conveyor 3, whereupon the next product 4 in the stack supported between the belts of the vertical conveyor 2 can move upwards and into the duct 5, that is, once the lateral opening 6 has been vacated by the previous product 4.

It will be clear that the object stated at the outset is comprehensively realized in a device according to the invention, since there is no dead time between the transfer of one product 4 and the entry of the next product 4 into the pneumatic duct 5.

The invention affords notable advantage also in the sphere of structural and operational economy, given that a source 8 of compressed air will be standard equipment generally in any wrapping machine of the type with which the device 1 is designed to operate.

Referring to FIG. 3, in yet another embodiment of the device, the outfeed end 20 of the first conveyor 2 connects with the duct 5 in axial alignment and the axis of the duct 5 which is curved. The connection between the duct 5 and the source 8 of compressed air is of the type indicated in FIG. 1. With this type of arrangement, moreover, the device 1 can also be utilized as an accelerator.

What is claimed is:

1. A device for transferring products from the outfeed end of a first conveyor to the infeed end of a second conveyor along a predetermined feed path, comprising:

a first conveyor having an outfeed end;

a second conveyor having an infeed end;

the outfeed end of the first conveyor being disposed substantially perpendicular to the infeed and of the second conveyor;

a pressurized pneumatic duct interposed substantially with no break in continuity between the outfeed end of the first conveyor and the infeed end of the second conveyor;

said duct connecting with a source of pressurized gas from which gas is delivered into the duct in a direction substantially convergent with the feed direction along which the products are conveyed;

said duct has a lateral opening connecting with said outfeed end of said first conveyor; and an axial opening connecting with said infeed end of said second conveyor;

said pneumatic duct being connected with said source of pressurized gas at a point located between the lateral opening of said pneumatic duct and said infeed end of said conveyor by way of at least one inlet hole, angled in relation to the longitudinal axis of said pneumatic duct and directed toward said infeed end of said second conveyor, of which the diameter and the inclination are such that a negative pressure can be generated internally of said pneumatic duct between said lateral opening and said inlet hole.

2. A device as in claim 1, wherein the axis of the pneumatic duct is curved, and the opposite ends are disposed in alignment respectively with the outfeed end of the first conveyor and with the infeed end of the second conveyor.

3. A device for transferring products from the outfeed end of a first conveyor to the infeed end of a second conveyor along a predetermined feed path, comprising:

a first conveyor having an outfeed end;

a second conveyor having an infeed end;

the outfeed end of the first conveyor being disposed substantially perpendicular to the infeed and of the second conveyor;

a pressurized pneumatic duct interposed substantially with no break in continuity between the outfeed end of the first conveyor and the infeed end of the second conveyor;

said duct connecting with a source of pressurized gas from which gas is delivered into the duct in a direction substantially convergent with the feed direction along which the products are conveyed;

the longitudinal axis of said pneumatic duct being curved; the opposite ends of said pneumatic duct being disposed in alignment respectively with said outfeed end of the first conveyor and with said infeed end of the second conveyor;

said pneumatic duct being connected with said source of pressurized gas by way of at least one inlet hole, angled in relation to said longitudinal axis of said pneumatic duct and convergent with a path along which products are transferred from said first to said second conveyor, of which the diameter and the inclination are such that a negative pressure can be generated internally of said pneumatic duct between said outfeed end of said first conveyor and said inlet hole.

4. A device for transferring products from the outfeed end of a first conveyor to the infeed end of a second conveyor along a predetermined feed path, comprising:

a first conveyor having an outfeed end;

a second conveyor having an infeed end;

the outfeed end of the first conveyor being disposed substantially perpendicular to the infeed and of the second conveyor;

a pressurized pneumatic duct interposed substantially with no break in continuity between the out feed end of the first conveyor and the infeed end of the second conveyor;

said duct connecting with a source of pressurized gas from which gas is delivered into the duct in a direction substantially convergent with the feed direction along which the products are conveyed;

the longitudinal axis of said pneumatic duct being curved; the opposite ends of said pneumatic duct being disposed in alignment respectively with said outfeed end of the first conveyor and with said infeed end of the second conveyor:

said pneumatic duct being connected with said source of pressurized gas by way of a plurality of holes, angled in relation to said longitudinal axis of said pneumatic duct and convergent with a path along which products are transferred from said first conveyor to said second conveyor, of which the diameter and the inclination are such that a negative pressure can be generated internally of said pneumatic duct between said outfeed end of said conveyor and said inlet holes.

5. A device for transferring products from the outfeed end of a first conveyor to the infeed end of a second conveyor along a predetermined feed path, comprising:

a first conveyor having an outfeed end;

a second conveyor having an infeed end;

the outfeed end of the first conveyor being disposed substantially perpendicular to the infeed and of the second conveyor;

a pressurized pneumatic duct interposed substantially with no break in continuity between the outfeed end of the first conveyor and the infeed end of the second conveyor;

said duct connecting with a source of pressurized gas from which gas is delivered into the duct in a direction substantially convergent with the feed direction along which the products are conveyed;

said duct has a lateral opening connecting with said outfeed end of said first conveyor; and an axial opening connecting with said infeed end of said second conveyor;

said pneumatic duct being connected with said source of pressurized gas by way of a plurality of inlet holes, each angled in relation to the longitudinal axis of said pneumatic duct and directed toward said infeed end of said second conveyor, of which the diameter and the inclination are such that a negative pressure can be generated internally of said pneumatic duct between said lateral opening and said inlet holes.

6. A device as in claim 5, wherein the inlet holes are located in various positions along the axis of the pneumatic duct.

7. A device for transferring products from the outfeed end of a first conveyor to the infeed end of a second conveyor along a predetermined feed path, comprising:

a first conveyor having an outfeed end;

a second conveyor having an infeed end;

the outfeed end of the first conveyor being disposed substantially perpendicular to the infeed and of the second conveyor;

a pressurized pneumatic duct interposed substantially with no break in continuity between the outfeed end of the first conveyor and the infeed end of the second conveyor;

said duct connecting with a source of pressurized gas from which gas is delivered into the duct in a direction substantially convergent with the feed direction along which the products are conveyed;

said duct has a lateral opening connecting with said outfeed end of said first conveyor; and an axial opening connecting with said infeed end of said second conveyor;

said pneumatic duct being connected with said source of pressurized gas by way of at least one inlet hole located in said pneumatic duct at a point preceding said lateral opening in relation to a path along which products are transferred from said first to said second conveyor.

\* \* \* \* \*